United States Patent
Ryder

(10) Patent No.: US 10,298,675 B2
(45) Date of Patent: May 21, 2019

(54) DYNAMIC MIGRATION WITHIN A NETWORK STORAGE SYSTEM

(71) Applicant: Apple Inc., Cupertino, CA (US)

(72) Inventor: Scott Ryder, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/825,629

(22) Filed: Aug. 13, 2015

(65) Prior Publication Data

US 2016/0021180 A1 Jan. 21, 2016

Related U.S. Application Data

(63) Continuation of application No. 12/846,363, filed on Jul. 29, 2010, now abandoned.

(51) Int. Cl.

| | |
|---|---|
| *G06F 15/173* | (2006.01) |
| *H04L 29/08* | (2006.01) |
| *G06F 9/48* | (2006.01) |
| *G06F 9/50* | (2006.01) |

(Continued)

(52) U.S. Cl.
CPC ........ *H04L 67/1074* (2013.01); *G06F 9/4856* (2013.01); *G06F 9/5072* (2013.01); *H04L 41/12* (2013.01); *H04L 43/08* (2013.01); *H04L 67/1095* (2013.01); *H04L 67/104* (2013.01)

(58) Field of Classification Search
CPC ..... H04L 67/1074; H04L 41/12; H04L 43/08; H04L 67/1095; H04L 67/104
See application file for complete search history.

(56) References Cited

U.S. PATENT DOCUMENTS

| | | |
|---|---|---|
| 6,192,340 B1 | 2/2001 | Abecassis |
| 7,237,268 B2 | 6/2007 | Fields |
| 7,266,839 B2 | 9/2007 | Bowers et al. |

(Continued)

FOREIGN PATENT DOCUMENTS

| | | |
|---|---|---|
| CN | 102089776 | 6/2011 |
| EP | 1939781 | 7/2008 |

(Continued)

OTHER PUBLICATIONS

"STR3EM Digital Distribution System." Amazon Web Services, 3pp. (Jun. 22, 2009).

(Continued)

*Primary Examiner* — Ryan J Jakovac
(74) *Attorney, Agent, or Firm* — Dickinson Wright RLLP

(57) ABSTRACT

This is directed to providing access to content stored on a personal cloud. In particular, a personal cloud can be constructed by sharing the resources of several devices owned by a user and by other users trusted by the user. To add a device to a personal cloud, the device can identify its owner to a librarian, which can provide addressing information for other devices forming a cloud on behalf of the owner. The new device can establish a communications path with the other devices, and configure itself based on the services or data required for the personal cloud (e.g., as determined from communications with the other devices). Services operating on individual devices of the personal cloud can migrate dynamically and automatically to ensure that a user can remove a device from the personal cloud at will without adversely affecting the operation of the personal cloud.

20 Claims, 8 Drawing Sheets

(51) Int. Cl.
*H04L 12/24* (2006.01)
*H04L 12/26* (2006.01)

(56) References Cited

U.S. PATENT DOCUMENTS

| | | | |
|---|---|---|---|
| 7,454,462 B2 | 11/2008 | Belfiore et al. | |
| 7,567,987 B2 | 7/2009 | Shappell et al. | |
| 7,720,767 B2 | 5/2010 | Ta et al. | |
| 7,802,293 B2 | 9/2010 | Boyer et al. | |
| 8,402,555 B2 | 3/2013 | Grecia | |
| 8,533,860 B1 | 9/2013 | Grecia | |
| 8,583,878 B2 * | 11/2013 | Nochimowski | G06F 12/0806 709/216 |
| 8,612,785 B2 | 12/2013 | Brown et al. | |
| 9,098,344 B2 | 8/2015 | Chandramouli et al. | |
| 2002/0055802 A1 | 5/2002 | Yasuda et al. | |
| 2002/0156893 A1 | 10/2002 | Pouyoul | |
| 2003/0182551 A1 | 9/2003 | Frantz et al. | |
| 2004/0116088 A1 | 6/2004 | Ellis et al. | |
| 2006/0123081 A1 | 6/2006 | Baudino et al. | |
| 2007/0266095 A1 | 11/2007 | Billsus et al. | |
| 2008/0040283 A1 | 2/2008 | Morris | |
| 2008/0077638 A1 * | 3/2008 | Monk | G06F 17/30138 |
| 2008/0080396 A1 | 4/2008 | Meijer | |
| 2008/0083025 A1 | 4/2008 | Meijer et al. | |
| 2008/0091763 A1 | 4/2008 | Devonshire et al. | |
| 2008/0134316 A1 | 6/2008 | Devonshire et al. | |
| 2008/0141048 A1 | 6/2008 | Palmer et al. | |
| 2008/0261605 A1 | 10/2008 | Larsen | |
| 2008/0294779 A1 | 11/2008 | Gkantsidis et al. | |
| 2009/0077055 A1 | 3/2009 | Dillon et al. | |
| 2009/0100060 A1 | 4/2009 | Livnat et al. | |
| 2009/0171999 A1 | 7/2009 | McColl et al. | |
| 2009/0198702 A1 | 8/2009 | Novik et al. | |
| 2009/0249439 A1 | 10/2009 | Olden et al. | |
| 2009/0252134 A1 | 10/2009 | Schlicht et al. | |
| 2009/0271639 A1 * | 10/2009 | Burge | G06F 9/4862 713/300 |
| 2009/0293108 A1 | 11/2009 | Weeden | |
| 2009/0307361 A1 | 12/2009 | Issa et al. | |
| 2010/0010944 A1 | 1/2010 | Cheng et al. | |
| 2010/0050172 A1 | 2/2010 | Ferris | |
| 2010/0083351 A1 | 4/2010 | Ryder | |
| 2010/0099426 A1 | 4/2010 | Lozinski et al. | |
| 2010/0106914 A1 | 4/2010 | Krishnaprasad et al. | |
| 2010/0169446 A1 | 7/2010 | Linden et al. | |
| 2010/0185868 A1 | 7/2010 | Grecia | |
| 2010/0251329 A1 * | 9/2010 | Wei | H04L 63/1408 726/1 |
| 2010/0325199 A1 | 12/2010 | Park et al. | |
| 2010/0325422 A1 | 12/2010 | Gnanasambandam et al. | |
| 2010/0332456 A1 | 12/2010 | Prahlad et al. | |
| 2010/0332560 A1 * | 12/2010 | Gerbasi, III | G11B 27/034 707/812 |
| 2011/0093941 A1 | 4/2011 | Liu et al. | |
| 2011/0099382 A1 | 4/2011 | Grecia | |
| 2011/0099616 A1 | 4/2011 | Mazur et al. | |
| 2011/0145392 A1 | 6/2011 | Dawson et al. | |
| 2011/0154212 A1 | 6/2011 | Gharpure et al. | |
| 2011/0209064 A1 | 8/2011 | Jorgensen et al. | |
| 2011/0225640 A1 | 9/2011 | Ganapathy et al. | |
| 2011/0231670 A1 | 9/2011 | Sheychenko et al. | |
| 2011/0265157 A1 | 10/2011 | Ryder | |
| 2011/0276901 A1 | 11/2011 | Zambetti et al. | |
| 2011/0282982 A1 * | 11/2011 | Jain | G06F 9/5094 709/223 |
| 2011/0289200 A1 * | 11/2011 | Patil | G06F 9/5027 709/223 |
| 2011/0295999 A1 * | 12/2011 | Ferris | G06F 9/5072 709/224 |
| 2012/0151220 A1 | 6/2012 | Grecia | |
| 2012/0166516 A1 | 6/2012 | Simmons et al. | |
| 2013/0007208 A1 | 1/2013 | Tsui et al. | |
| 2014/0181172 A1 | 6/2014 | Elliott | |
| 2015/0039767 A1 | 2/2015 | Matczynski et al. | |

FOREIGN PATENT DOCUMENTS

| | | |
|---|---|---|
| WO | 2002/039215 | 5/2002 |
| WO | 2009/012132 | 1/2009 |
| WO | 2014/180417 | 11/2014 |

OTHER PUBLICATIONS

"STR3EM Specifications—what's new in version 2.3.2" cnet, Download.com, 1 p. (Dec. 9, 2009).

Simon L. Garfinkel, "Email-Based Identification and Authentication: An Alternative to PKI?", IEEE Security & Privacy, http://computer.org/security/, published Nov. 2003, pp. 20-26.

Chesire, Stuart et al., "Understanding Apple's Back to My Mac Service", Draft-zhu-mobileme.do-01.txt, Network Working Group, Internet-draft., Mar. 8, 2010, 16 pages.

Wang et al., "Hadoop High Availability through Metadata Replication" Conference on Information and Knowledge Management Proceeding of the first International workshop on Cloud data management, Hong Kong, China, Nov. 2, 2009, pp. 37-44.

International Preliminary Report on Patentability from PCT Application No. PCT/US2011/045496 dated Feb. 7, 2013.

European Patent Application 11749605.9—Communication pursuant to Rule 137(4) EPC and Art. 94(3) EPC dated Oct. 10, 2018.

* cited by examiner

DYNAMIC MIGRATION WITHIN A NETWORK STORAGE SYSTEM

CROSS-REFERENCE TO RELATED APPLICATIONS

This application is a continuation to U.S. Non-Provisional patent application Ser. No. 12/846,363, filed on Jul. 29, 2010, entitled "Dynamic Migration Within a Network Storage System," the content of which is incorporated herein by reference in its entirety.

FIELD

This is directed to configuring components of a personal network storage system. In particular, this is directed to managing the seamless addition and removal of devices in a personal network storage system.

BACKGROUND

With the increased availability of high speed Internet connections, many devices have the ability to connect to remote services or sources. In addition, as the cost of high speed Internet connections decreases, many users may maintain a constant or near constant connection to the Internet. Furthermore, as wireless communications systems expand, users can connect to remote sources at many different locations, including far from the user's work, home or other areas where the user typically can access the Internet. For example, wireless communications networks have expanded to the point where a device can connect to the Internet on a mountaintop in nature (e.g., while skiing or hiking).

Because of the enhanced ability of devices to connect to the Internet as a user moves or travels, a user can make an increased use of remote storage. In particular, a user can store information in one or more remote locations, while knowing that the information can remain accessible so long as the user has an Internet connection available. This can allow a user to expand the amount of storage available to the user beyond the actual storage within the device (e.g., the storage of a hard drive or solid state drive in a device).

A device can connect to any suitable remote storage source to store or access content including, for example, using one or more cloud storage solutions. A cloud storage solution can typically include one or more racks of storage devices geographically located in one or more locations and connected to each other and to the Internet. The storage devices can be managed by a system administrator, who can perform various tasks to ensure that the cloud operates properly. In particular, a system administrator can define and set profiles for different devices, perform periodic checks, replace or maintain devices, and in some cases manage some or all of the data stored in the cloud. While such cloud storage may be of use to a user, it may also come at a cost. In particular, the cloud provider can charge a monthly or other recurring fee in exchange for use of the cloud storage (and the recurring fees can be charged whether or not the user is using the storage). In addition, the cost of operating a cloud storage system can include not only material costs (e.g., storage devices) but also network administration costs. In particular, each time a new device is added to the cloud, or each time a device is removed from the cloud, administrative action may be required to configure the new device or migrate data, services, or both among remaining devices of the cloud. This can require both time and administrator resources.

SUMMARY

This is directed to systems, methods and computer-readable media for enabling an individual user to create personal or private network storage systems, such as personal clouds, where the cloud can auto-configure itself to reduce or eliminate management duties on behalf of the user.

A user can define a personal cloud by selecting a list of devices controlled by the user to include in the cloud. The devices in the list can identify themselves and their owner to a librarian, which can allocate resources of the identified devices for the personal cloud. In addition, the user can elect to trust one or more other users, whose devices can also be made available for use by the cloud. The librarian can then select a set of devices to combine to form the personal cloud, where the devices are owned by one or more users.

The particular devices to be included as part of a cloud, however, can change over time. For example, a computer owned by a user can be connected or disconnected from an available network connection on an ad hoc basis (e.g., when a notebook device is disconnected from the Internet while in transit). As another example, a computer owned by a user can be turned off at any time. As still another example, a user can allocate or remove resources of a remote storage device (e.g., an external hard drive) to or from a device or network. As the availability of a device changes, the device may need to be configured to be used by the personal cloud.

A user can define a personal cloud using any suitable approach. In some embodiments, a user can identify one or more devices owned by the user to a librarian. The user can also identify other users that the user trusts, whose devices can be included in a personal cloud used by the user. When a user needs access to a personal cloud, the user can provide a request to the librarian. The request can include, for example, a cloud size, one or more particular trusted users, or other criteria. In response to receiving the request, the librarian can identify one or more devices owned by the user or by trusted other users having resources available for the personal cloud. The librarian can provide information for locating some or all of the identified devices, and can enable the identified devices to communicate amongst themselves to establish a network storage system (e.g., a personal cloud) constructed from the resources of each of the identified devices.

As the user makes use of the personal cloud, the resources of the different devices can be used. At some point, the personal cloud may have no resources remaining for storing new data, or for providing services to a user. The user may then be required to add a new device (e.g., purchase a new external hard drive) for the personal cloud, or allocate additional resources from a connected device. As another example, a device owned by the user can be turned off or disconnected from a network connection, and later turned back on or re-connected. As these devices become available again, or available for the first time to the personal network, the devices may need to be configured or re-configured to be usable by the personal cloud.

Each new device can be owned by a particular user (e.g., the device owner). For example, each device can include an application operating on or accessing the device, where the application is controlled by the particular user. The new device, upon connecting to the network, can identify itself to the librarian, and identify the particular user or owner of the device. In response to receiving the identification, the librarian can identify other devices forming an appropriate personal cloud (e.g., a local cloud for the particular user, or a private cloud for a user trusting the particular user). The new device can then communicate with the other devices to indicate its availability (for example, the amount of space on the device that is being made available to the cloud), and provide its resources to the personal cloud that includes the other devices. In some cases, one or more of the other devices of the personal cloud can, instead or in addition, request from the librarian, a list of available devices for the personal cloud. In response to receiving the request, the librarian can provide a listing of devices that includes the new device (which previously identified itself to the librarian, and is therefore known to the librarian).

Each device forming part of a personal cloud can have a different purpose, or provide different services to the personal cloud. For example, some devices can provide processing resources, and other devices can provide data storage resources. As another example, devices can provide services for storing data, operating catalogs, or other operations that ensure that a user can seamlessly interact with the personal cloud. When a device is added to a personal cloud, one or more services can be selected to operate on the new device. For example, a data service or a catalog service (e.g., a data distribution and management service that manages or coordinates a data service) can be implemented on the new device. The particular service or use of the new device can be selected using any suitable approach. For example, different devices forming the cloud can coordinate to ensure that all of the necessary services are made available. As another example, the devices can coordinate with each other to ensure that backups and redundancy is secured. In some cases, the catalog service can assign the particular service to the new device.

The particular service or operation provided by each device can change dynamically. For example, one or more devices can be removed from the network, and their services transferred to other devices. To ensure that a user's experience remains seamless, the services provided by different devices can be redundantly stored and synchronized across several devices (e.g., backup metadata used by a service). Some of the services may be disabled based on services provided by the available devices to avoid conflicts between the same services operating on different devices. The disabled services can shadow an active service to ensure that they are accurate and current, should they need to become active (e.g., to ensure that a catalog service includes the most recent interactions of users with data stored in the personal cloud). When a device having an active service is removed from the personal cloud, another device operating the same service, but inactively, can be activated. Alternatively, the service can be dynamically transferred to another device (that may or may not be shadowing an active service) in the cloud prior to disconnecting the removed device.

In some cases, a personal cloud can dynamically adjust the distribution of services in devices based on other criteria. For example, a personal cloud can select to assign a particular service to a device based on geographic location relative to end user needs, device failure, backup or replication considerations, energy saving, growth or device capacity, expected availability of device resources, or combinations of these. This approach can allow the personal cloud to seamlessly and non-disruptively move data and services while maintaining the availability of the personal cloud services and allowing individual users to arbitrarily remove device resources from the personal cloud.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

This is directed to configuring devices added to a personal network storage system. In addition, this is directed to managing the distribution and migration of data and services in the personal network storage system without requiring an administrator.

Figure 1:
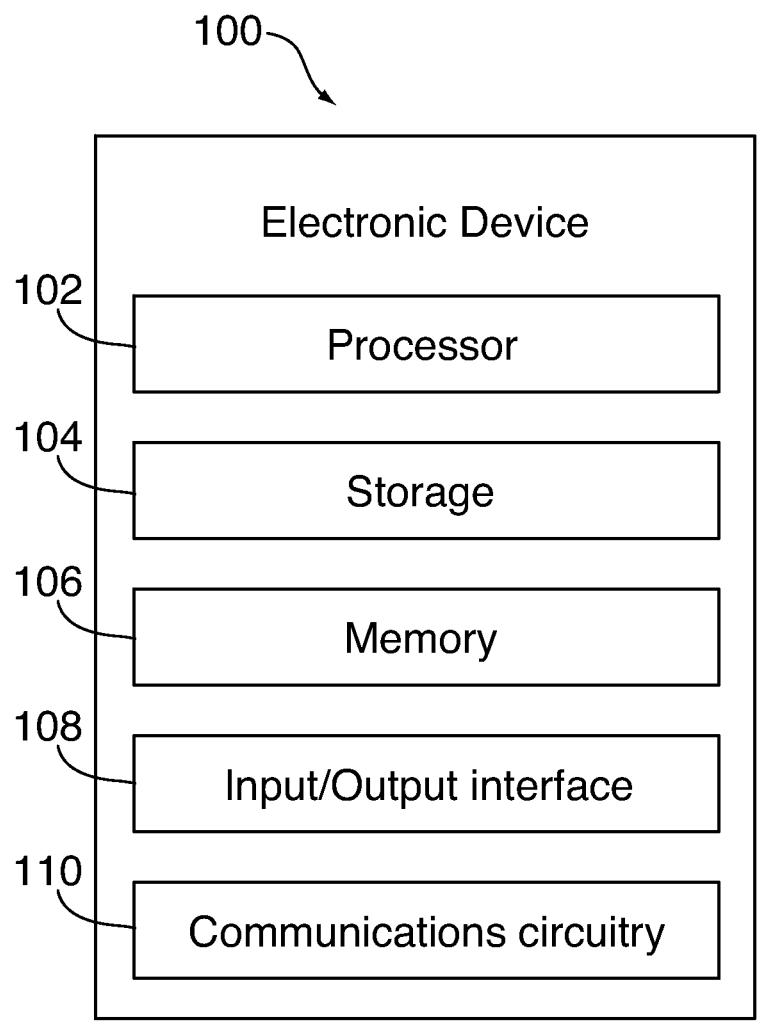
FIG. 1 is a schematic view of an illustrative electronic device for use in a network storage system in accordance with one embodiment of the invention.

FIG. 1 is a schematic view of an illustrative electronic device for use in a network storage system in accordance with one embodiment of the invention. Electronic device 100 can include any suitable type of electronic device operative to connect to a network storage system or to be used as part of a network storage system. For example, electronic device 100 can include a media player such as an iPod® available by Apple Inc., of Cupertino, Calif., a cellular telephone, a personal e-mail or messaging device, an iPhone® available from Apple Inc., pocket-sized personal computers, personal digital assistants (PDAs), a laptop computer, a music recorder, a video recorder, a gaming device, a camera, a storage device, and any other electronic device having resources that can be allocated to a personal cloud.

Electronic device 100 can include a processor or control circuitry 102, storage 104, memory 106, input/output circuitry 108, and communications circuitry 110 as typically found in an electronic device. The electronic device components can be operative to enable any of the uses expected from the electronic (e.g., connect to a personal network storage system, or provide resources to a personal network storage system). In some embodiments, one or more of electronic device components 100 can be combined or omitted (e.g., one could combine together storage 104 and memory 106, or either could be omitted). Electronic device 100 can include other components not combined or included in those shown in FIG. 1 (e.g., a sensor array or positioning circuitry), or electronic device 100 can include several instances of the components shown in FIG. 1. For the sake of simplicity, only one of each of the components is shown in FIG. 1.

Control circuitry 102 can include any processing circuitry or processor operative to control the operations and performance of electronic device 100. Storage 104 can include, for example, one or more storage mediums including a hard-drive, solid state drive, flash memory, permanent memory such as ROM, any other suitable type of storage component, or any combination thereof. Memory 106 can include cache memory, semi-permanent memory such as RAM, and/or one or more different types of memory used for temporarily storing data. In some embodiments, memory 106 and storage 104 can be combined as a single storage medium.

Input/output interface 108 can convert (and encode/decode, if necessary) analog signals and other signals into digital data. For example, input/output interface 108 may receive and convert physical contact inputs (e.g., from a multi-touch screen or a button press), physical movements (e.g., from a mouse or sensor), analog audio signals (e.g., from a microphone), or any other input provided by a user. Although input/output interface 108 is illustrated in FIG. 1 as a single component of electronic device 100, several instances of input/output interface 108 can be included in electronic device 100.

Electronic device 100 can include any suitable mechanism, circuitry or component for allowing a user to provide inputs to input/output interface 108. For example, electronic device 100 may include a button, keypad, dial, a click wheel, or a touch interface (e.g., a capacitive touch screen), or combination of these. In some embodiments, input/output information 108 can, instead or in addition, include circuitry, software, firmware, or other components for detecting and processing voice inputs or other audio inputs. In some cases, input/output interface 108 can be operative to detect and process inputs received from gestures of the device (e.g., inputs detected from movements of the device, such as shaking, twisting or spinning).

Electronic device 100 can include specialized output interfaces associated with output signals such as, for example, one or more audio or visual outputs. An audio output may include one or more speakers (e.g., mono or stereo speakers) built into electronic device 100, or an audio component that is remotely coupled to electronic device 100 (e.g., a headset, headphones or earbuds that may be coupled to communications device with a wire or wirelessly). A visual output can include display circuitry (e.g., a screen or projection system) for providing a display visible to the user. For example, the display circuitry can include a screen (e.g., an LCD screen) that is incorporated in electronics device 100, a movable display or a projecting system for providing a display of content on a surface remote from electronic device 100 (e.g., a video projector), or combinations of these. In some embodiments, input/output interface 108 can include a coder/decoder (Codec) to convert digital media data into analog signals such as, for example, video Codecs, audio Codecs, or any other suitable type of Codec.

Communications circuitry 110 may be operative to communicate with other devices or with one or more servers using any suitable communications protocol. Electronic device 100 may include one more instances of communications circuitry for simultaneously performing several communications operations using different communications networks. For example, communications circuitry may support Wi-Fi (e.g., a 802.11 protocol), Ethernet, Bluetooth™ (which is a trademark owned by Bluetooth Sig, Inc.), radio frequency systems, cellular networks (e.g., GSM, AMPS, GPRS, CDMA, EV-DO, EDGE, 1GSM, DECT, IS-136/TDMA, iDen, LTE or any other suitable cellular network or protocol), infrared, TCP/IP (e.g., any of the protocols used in each of the TCP/IP layers), HTTP, FTP, RTP, RTSP, SSH, Voice over IP (VOIP), any other communications protocol, or any combination thereof. In some embodiments, communications circuitry 110 may include one or more communications ports operative to provide a wired communications link between electronic device 100 and a host device. For example, a portable electronic device may include one or more connectors (e.g., 10 pin connectors or USB connectors) operative to receive a cable coupling the portable electronic device to a host computer. Using software on the host computer (e.g. iTunes available from Apple Inc.), the portable electronic device may communicate with the host computer.

In some embodiments, electronic device 100 can include a device having a limited interface. For example, electronic device 100 can serve as a storage node for a network storage system. In particular, electronic device 100 can be limited to a device having storage capabilities, and communications circuitry to connect the electronic device to a communications network. The device may not include an integrated input interface, but may instead be remotely accessed by another device (e.g., over a wired or wireless communications path).

Figure 2:
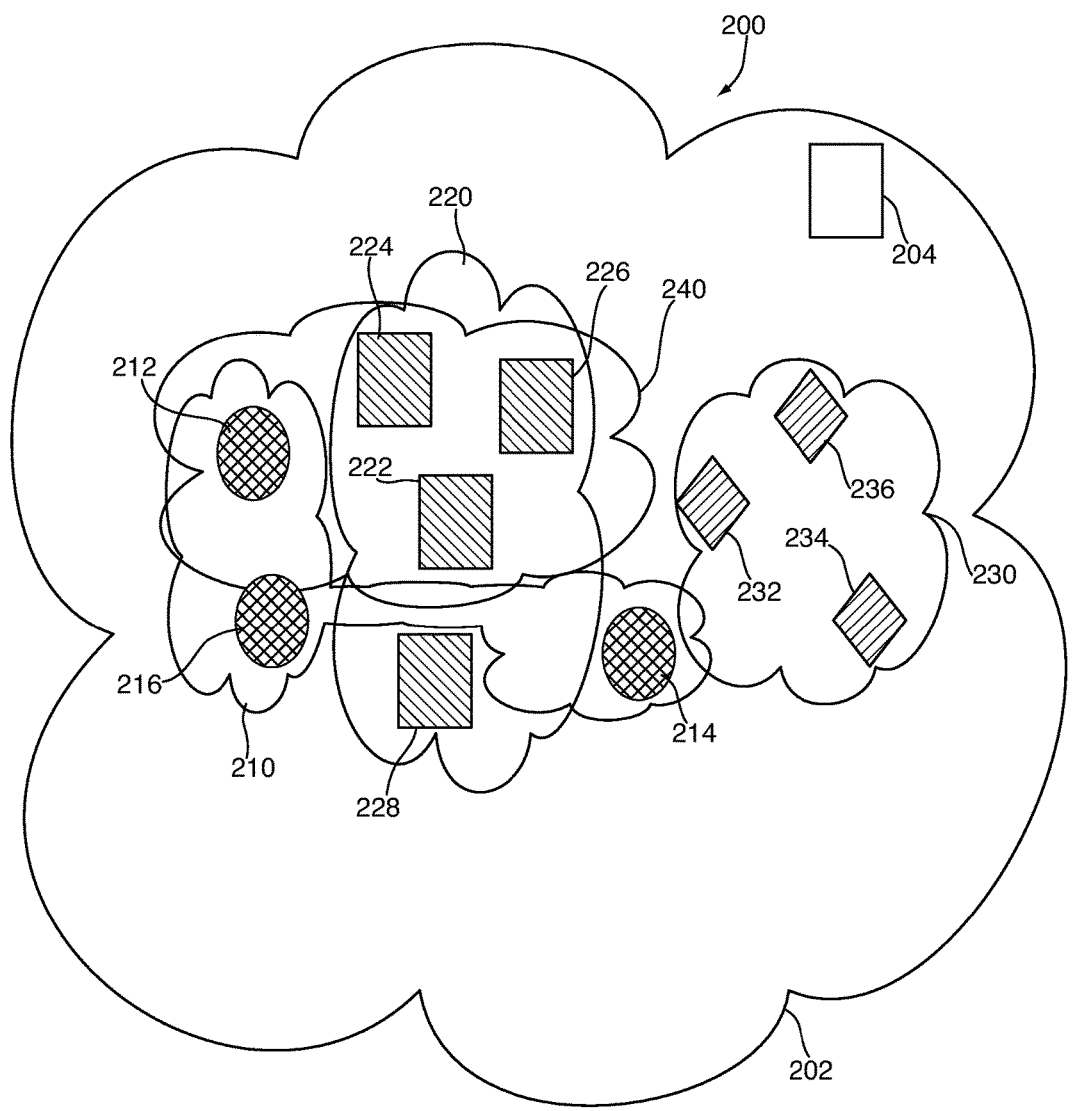
FIG. 2 is a schematic view of an illustrative network storage system in accordance with one embodiment of the invention.

Several electronic devices, including electronic devices having some or all of the same features, can be connected to each other to form a sub-network over which information can be shared. In particular, a user may own several devices that are interconnected to share information or to store information that can be accessed from any of the devices. FIG. 2 is a schematic view of an illustrative network storage system in accordance with one embodiment of the invention. System 200 can include electronic devices 212, 214 and 216 associated with a first user (e.g., a first owner), devices 222, 224, 226 and 228 associated with a second user (e.g., a second owner), and devices 232, 234 and 236 associated with a third user (e.g., a third owner). It will be understood, however, that system 200 can include any suitable number of devices associated with any suitable number of users. Each of the devices associated with particular users can be connected in a personal sub-network owned by the corresponding user or owner. For example, sub-network 210 can include the devices associated with the first user, sub-network 220 can include the devices associated with the second user, and sub-network 230 can include the devices associated with the third user. Each of the sub-networks can be secured, such that information can be shared between devices on a sub-network, but not accessed from other devices outside of the sub-network. In other words, the sub-networks can be limited to devices owned by the same owner.

In some embodiments, some or all of the devices can be connected to a communications network that allows the interconnection of all of the devices. For example, the devices shown in FIG. 2 can be connected to global communications network 202 (e.g., the Internet). Each device can connect directly to the communications network (e.g., via communications circuitry connected to an access point for the communications network), or via an intermediary device (e.g., connect to the communications network by connecting to a device having an access point for the communications network). Using communications network 202, devices that are part of individual communications networks can communicate across individual networks.

In some embodiments, different users can elect to share resources to form a communications network that spans several individual sub-networks. For example, the first user can elect to trust the second user, and vice versa. Each user can allocate some of the user's devices for the shared communications network. For example, the first and second users can connect devices 212, 222, 224 and 226 together to form communications network 240. The devices can communicate over communications network 202, using one or more authentication and encryption protocols. Some or all of the users providing devices or specific resources of devices to a local, private, or personal cloud can have different levels of access to the personal cloud. For example, the first and second users can define a cloud having both of their devices, and to which the first and second users have read and write access. Alternatively, one of the users can define a cloud that includes devices from both users, but that does not provide read access or write access to the other of the first and second users providing devices to the personal network.

Any suitable number of personal clouds can be constructed using the devices connected to the communications network. For example, each of several users trusting other users can create a personal cloud, where the personal cloud includes devices owned by users other than the one requesting the cloud. In some cases, one device can be used in several personal clouds, where different resources or different portions of a same resource (e.g., different amounts of storage) are made available by the device to each of the clouds.

The personal network system, and the formation and administration of personal clouds, can be managed or administered, at least partially or summarily, by a control system. For example, the system can include a librarian service operating on a master device of network 202. The master device can include any suitable feature or component including, for example, one or more components described in connection with device 100 (FIG. 1). In some embodiments, network 202 can include a server 204 on which a librarian service is operating. Server 204 can be provided by any suitable entity including, for example, a cloud service provider, an Internet Service Provider, or any other provider of services over network 202. In some embodiments one or more end users can instead or in addition provide server 204. The librarian service can manage any suitable number of personal networks, or any suitable number of owners identifying devices available for personal networks. In some cases, a librarian service can coordinate an arbitrary number of personal networks built out of devices owned by different users, and connected by any suitable means.

While the nodes of a personal cloud can communicate amongst themselves to configure and operate services including data storage on the personal cloud, the different nodes may need an anchor to serve as a reference for addressing information. In some embodiments, the librarian process can serve as an anchor for providing location information for nodes of different personal clouds (e.g., the librarian knows the addresses for different nodes, as node addresses can change when individual devices are disconnected and reconnected to the communications network). For example, the librarian can initially provide addressing information for nodes of the personal cloud to a new device added to the cloud.

To ensure that a user can trust the devices in a personal cloud, users of personal clouds can rely on a web of trust. The web of trust can be defined by a sequence of one or two-direction connections between different users. Each time a first user elects to trust a second user, a new trust connection can be established between the first user and the second user. When the second user trusts the first user, a new trust connection can be established between the second user and the first user, or the initial connection between the first user and the second user can be modified to indicate bi-directional trusting. In a system with a large number of users trusting each other, the resulting trust connections can form a lattice or web (e.g., a web of trust). The web of trust can be maintained and guaranteed by the librarian, such that the librarian can provide trust information to any user or device requesting the identity of trusted owners. The trust information can include, for example, listings of other users trusted by a particular user (e.g., the trust information can describe trust relationships corresponding to the particular user).

To form a personal cloud, a user may first identify to the librarian the one or more devices owned by the user. For example, the user can install a personal network client application on devices owned by the user, where the application can identify the user for the devices. As another example, one or more of the devices known to be owned by the user can identify other devices connected to a personal network of the user (and therefore assumed to also be owned by the user), and provide identifying information for those devices to the librarian.

The user can elect to contribute any resources of the user's devices to a personal network. For example, the user can select to contribute storage, processing, or other device resources. In particular, the user can assign a particular amount of storage, or a particular level of processing to a personal cloud (e.g., 40% of RAM or CPU). In some cases, the user can condition the availability of resources. For example, the user can reduce the resources provided to a personal cloud when a process on the user's device requires the resources. As another example, the user can provide resources based on the time of day. As still another example, the user can provide resources based on cost considerations (e.g., allow resources to be provided so long as the power costs of providing the resources are less than a threshold).

In addition to identifying devices, and specific resources of devices to contribute to the librarian, a user can identify other users whose devices are trusted by the user. In particular, the user can identify friends, family members, co-workers, or other people that the user knows and trusts with the user's data. The user can identify the other users using any suitable approach including, for example, using an e-mail address. In particular, the user can select contact information for several users, and provide the contact information to the librarian.

Each user can identify the device resources that the user wishes to make available for personal clouds, as well as the other users or owners that are trusted to the librarian using any suitable approach. In some embodiments, a device of the user can include an interface for identifying device resources, and selecting other users to trust.

Figure 3:
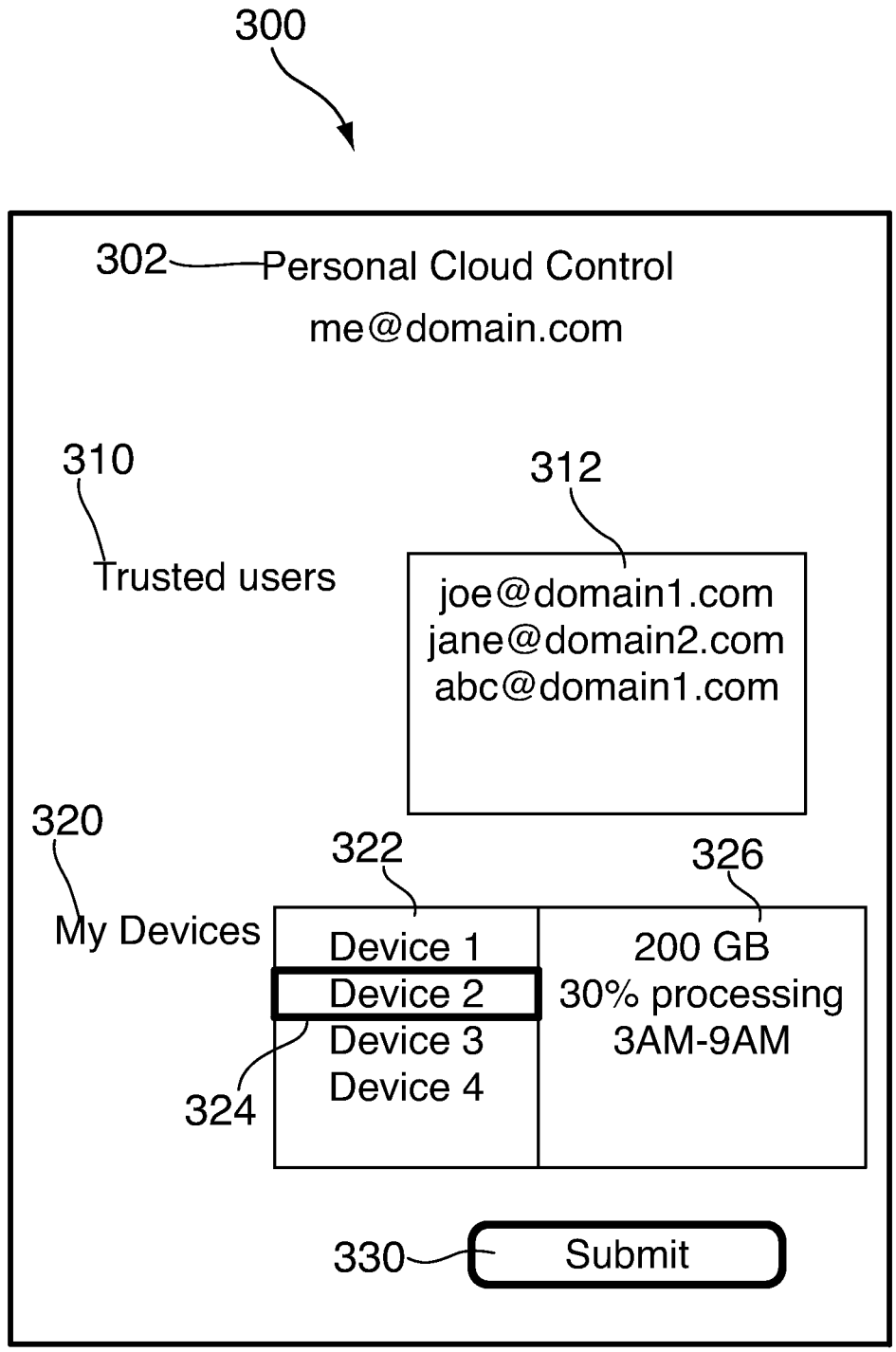
FIG. 3 is a schematic display of an interface for providing information regarding trusted devices and available device resources to a librarian in accordance with one embodiment of the invention.

FIG. 3 is a schematic display of an interface for providing information regarding trusted devices and available device resources to a librarian in accordance with one embodiment of the invention. Display 300 can include title 302 indicating that the display corresponds to a personal cloud setup page. In particular, display 300 shows devices and resources available for a personal cloud. Display 300 can provide an interface for identifying one or more specific other users that the user trusts, and with which the user agrees to share resources. For example, display 300 can include identifying label 310 corresponding to field 312 into which the user can identify trusted other users. The other users can be identified using any suitable approach including, for example, from an e-mail address or other identifying information provided or known to the librarian. In some embodiments, the identity of the user of the device providing display 300 (e.g., as known by the librarian) can be displayed, for example in the vicinity of title 302.

In some embodiments, the user can (e.g., using display 300) select the specific resources 320 that the user is willing to dedicate to a personal cloud. For example, the user can list, in field 322, the individual devices associated with that user. In some embodiments, one or more of the devices can be automatically identified by the librarian, or by the device providing display 300. For example, the device used by the user can detect the other devices in the personal network associated with the user's devices. The user can select a particular device using highlight region 324, and provide, in box 326, device resources for the selected particular device to make available to the personal cloud. The user can select any suitable resource including, for example, storage (e.g., in a percentage or numerical amount), processing resources (e.g., percentage of clock cycles), or combinations of these. In some embodiments, the user can define one or more limitations to the shared resources, such as time constraints, restrictions based on the resources used or required by a user, connection speed, resource cost, or combinations of these. Once a user has specified one or more trusted users and allocated device resources, the user can provide an instruction to transmit the information to the librarian (e.g., select submit option 330).

A user can form a personal network storage system (e.g., a local, personal, or private cloud) using any suitable approach. In some embodiments, a user can provide a request to the librarian for a personal cloud. The user request can include any suitable criteria or requirement including, for example, a storage requirement (e.g., at least 1 TB). In response to receiving a request, the librarian can identify a collection of devices having resources satisfying the request's criteria, where the devices are selected from devices owned by the user, and from devices owned by other users trusted by the user.

The librarian can identify the particular devices to use in the personal cloud using any criteria. For example, the librarian can identify devices that meet the resource requirements. As another example, the librarian can identify devices located in geographic proximity of the user. As still another example, the librarian can select devices based on their historic or expected availability and connectivity to the communications network (e.g., the connection speed of a device). Once the librarian has identified the particular devices to use in the personal cloud, the librarian can provide addressing or identification information for those devices to the requesting user or requesting device. The requesting device can then contact the identified other devices and configure a personal cloud in consort with the other devices.

Each device used in a personal cloud can be configured for use in the cloud using any suitable approach. In some embodiments, the librarian can configure the devices. Alternatively, and to reduce the burden on the librarian and more efficiently manage each personal cloud, the devices of the personal cloud can communicate and distribute services (and data managed or used by the services) in an appropriate fashion. To operate properly, several different services may need to be provided by devices in the personal cloud. For example, a catalog service can be used to provide cards corresponding to stored data so that users can interact with cards instead of actual underlying data. As another example, a data service can be used for storing and managing data stored in the personal cloud. The data service can ensure that data is stored and distributed in different devices, is adequately backed up, and made available to a user upon a corresponding request. As still another example, a repair or healing service can be provided to ensure that data is not lost, and that devices remain operable for the personal cloud. In addition to determining which services should be stored on different nodes, the devices may need to coordinate, under the instruction of a data service, to determine where to store data used by the services, or stored by a user. In particular, different data can be distributed across different nodes of the personal cloud.

Any suitable approach can be used to distribute services and data among the devices of a personal cloud. In some embodiments, the device providing the initial request to a librarian to form a personal cloud can establish communication paths with the other devices forming the cloud, and assign particular tasks or services to each device. Alternatively, the devices can consult and distribute tasks based on the available resources and suitability of each device for the tasks or services. As still another example, one device of the cloud can implement a coordinating service to ensure that the proper services (and their respective data or metadata) are assigned to particular devices of the personal cloud.

As a user makes use of the cloud, the user may use up the available resources of the individual devices forming the cloud. For example, the user can store enough data to fill the storage resources allocated by devices of the cloud. As another example, processing operations requested by a catalog service or other service operating on the personal cloud can take up the available processing resources of the cloud devices. When one or more devices of the personal cloud (e.g., a device providing the coordinating service, or a device having no available storage resources remaining) determine that additional resources are not available, the devices can provide a corresponding request for resources to the librarian. The personal cloud can then be deemed to be a "calling" personal cloud (e.g., calling for additional resources). In some embodiments, the librarian can, instead or in addition, monitor the resource use of different devices of personal clouds, and detect when resources become scarce without requiring individual devices to provide a request for additional resources.

Figure 4:
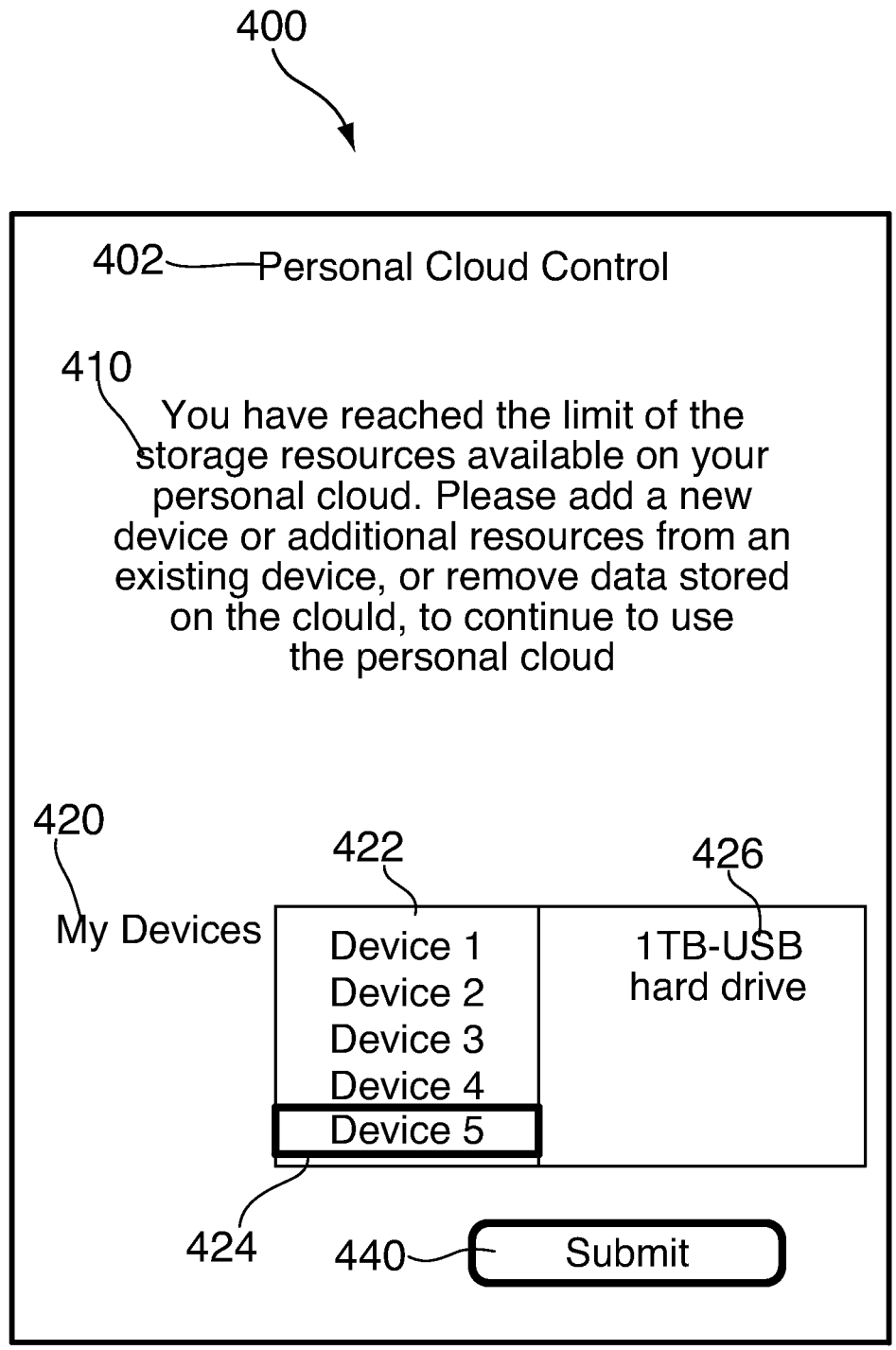
FIG. 4 is a schematic view of an illustrative display for directing a user to add new resources to a personal cloud in accordance with one embodiment of the invention.

In response to determining that additional resources are required, or to receiving a request for additional resources, the librarian can identify other devices owned by the user, or by trusted users that can be used for the personal cloud. Alternatively, the librarian can direct a device used by the user to prompt the user to add new devices or resources to the calling personal cloud. FIG. 4 is a schematic view of an illustrative display for directing a user to add new resources to a personal cloud in accordance with one embodiment of the invention. Display 400 can be provided as a standalone display, pop-up window, or any other type of display or interface provided to the user. Display 400 can include title 402 corresponding to controlling the cloud. Display 400 can include message 410 instructing the user to add new resources for a calling personal cloud, or remove data currently stored on the cloud, to continue to use the cloud. To enable the user to respond to message 410, display 400 can include options 420 for identifying existing devices owned by the user, or for identifying a new device owned by the user having available resources. In particular, options 420 can include devices 422, which can be selected by highlight region 424. In response to receiving a selection of a particular device, options 420 can include resources 426 of the device that the user can contribute to a personal cloud.

In the example of display 400, the resources provided can include storage space (e.g., 1 TB from a USB hard drive).

In some embodiments, the device or librarian can recommend particular devices to add to the calling cloud, or particular resources of devices to add to the calling cloud. For example, the device or librarian can automatically add a particular device or resource in options 420. The particular device or resource can be selected based on any suitable criteria including, for example, by monitoring the use of resources of devices owned by the user, receiving an indication from the other devices of available resources, identifying new devices owned by the user on a personal network (e.g., within a subnet), or combinations of these. Once the new device or resources have been selected for the personal cloud, the user can provide an approval instruction (e.g., select submit option 440).

In some embodiments, a user may not be required to add a new device to the personal network. Instead, it may be sufficient for a user to simply re-connect a previously available device, or re-allocate device resources that were removed to the calling cloud. In such cases, a user can re-connect the device or re-allocate the resources such that the device and resources appear in option 420 of display 400. Alternatively, when the device or resources become available again, the personal cloud can detect the device or resources and determine that additional resources are no longer necessary. The calling cloud can then direct the device providing display 400 to automatically remove the display (and can indicate to the librarian service that additional resources are no longer necessary).

When new devices are identified for a personal cloud, the new devices may need to be configured prior to being available for use. Similarly, previously connected devices may need to be reconfigured before they can be used by the cloud, as their previous function (e.g., the services and data that were previously stored) may no longer be relevant or useful to the cloud. In addition, addressing information previously used to contact different devices or nodes in the personal cloud may be different, as devices may have disconnected and reconnected to the network. A device connecting to a personal cloud (e.g., connecting for the first time or re-connecting) can retrieve addressing information for the nodes of the personal cloud using any suitable approach. In some embodiments, the device can retrieve addressing information from the librarian.

Because different devices of a personal cloud can change addresses in the communications network when they are disconnected and reconnected, the librarian may be necessary to provide an anchor that knows how to contact each device. In particular, whenever a device reconnects to the communications network, the device can identify itself and its address to the librarian, and request addressing information for other devices used in a cloud requested by the same user, or used in a personal cloud requested by other trusted users. In some cases, the device can, instead or in addition, identify its owner, which may be known from a setup operation of the device. The librarian can maintain a current directory of all connected devices and their addresses so as to respond to addressing quarries.

The librarian can identify the particular users trusted by the owner of a new device using any suitable approach. In some embodiments, the new device may know, as part of an initial installation or ongoing operation of an application used to connect to the personal cloud, the other users trusted by the owner. In some cases, the device can receive a listing of trusted users from other devices belonging to the owner (e.g., other devices on a same personal area network, or other devices having same identification or authorization credentials). The device can then provide the listing of trusted users to the librarian, which can in turn retrieve a listing of devices owned by the trusted users, and provide addressing information for those devices. In some embodiments, the new device can, instead or in addition, not know the particular users trusted by the owner of the new device. Instead, the device can rely on the librarian to provide a web of trust in which the trust relationships are stored and maintained. In particular, each time a user elects to trust another user, or cease trusting another user (e.g., by providing a trust instruction, for example by using display 300 as shown in FIG. 3), the device receiving the trust information can provide a revised listing of trusted users to the librarian. Using the received listing, the librarian can update and revise its collection of trust information. When the new device identifies itself and its owner to the librarian, the librarian can then retrieve the listing of users trusted by the owner of the device, identify addressing information for the devices owned by the trusted users, and provide the addressing information to the device. In some embodiments, the librarian can, instead or in addition, identify one or more particular personal clouds in need of additional resources, and provide addressing information for the devices of those personal clouds.

Figure 5:
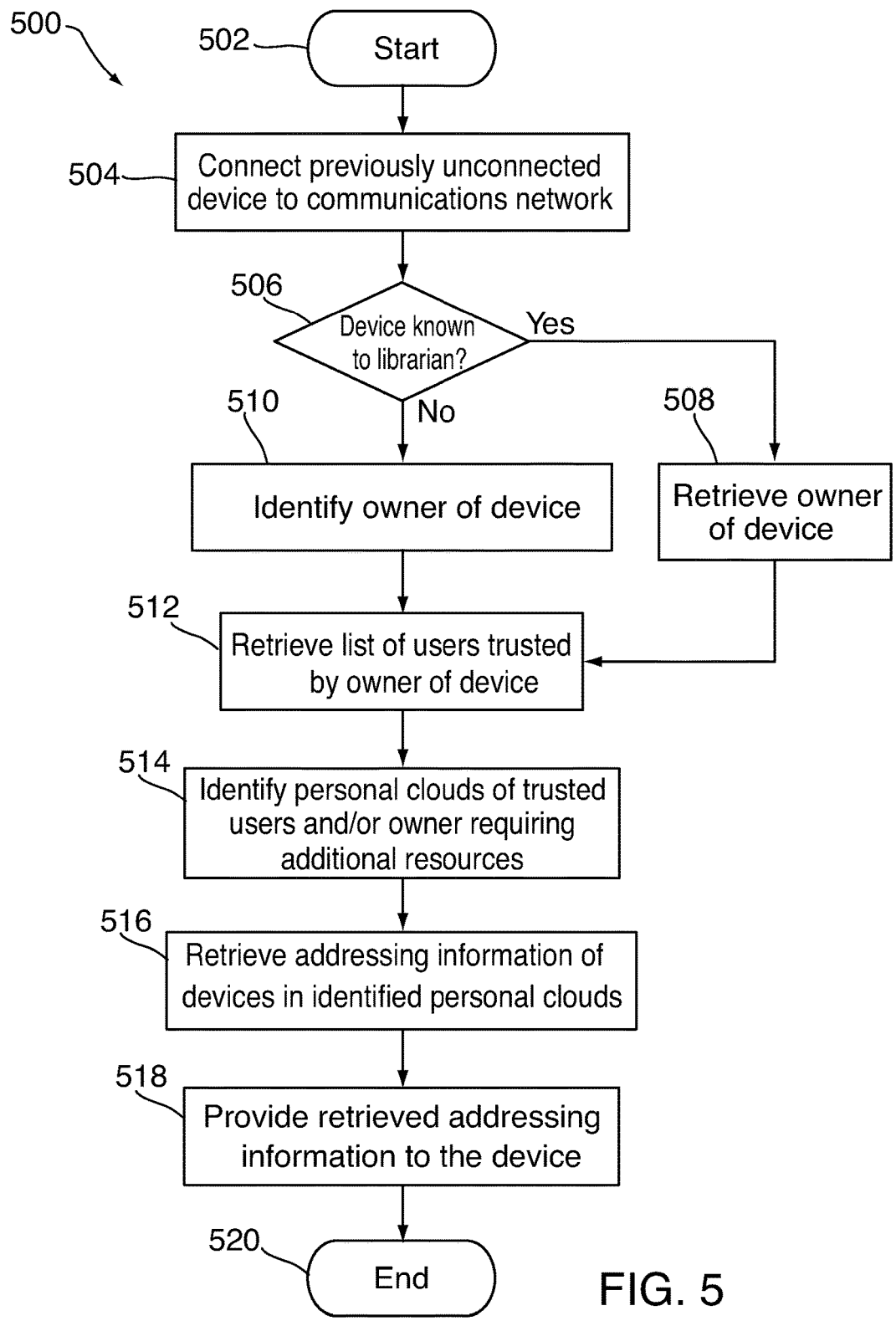
FIG. 5 is a flowchart of an illustrative process for providing addressing information to a new device contacting a librarian in accordance with one embodiment of the invention.

FIG. 5 is a flowchart of an illustrative process for providing addressing information to a new device contacting a librarian in accordance with one embodiment of the invention. Process 500 can begin at step 502. At step 504, a device that was previously unconnected can be connected to a communications network. For example, a newly added device can be connected to a communications network. As another example, a device connected to a communications network, but that was never used in a personal cloud can be made available for a personal cloud. As still another example, a device previously connected to a communications network and used in a personal cloud can be reconnected. Once connected to the communications network, the device can contact a librarian. At step 506, the librarian can determine whether the device is known. For example, the librarian can determine whether a device having the same owner and same properties has previously contacted the librarian. As another example, the librarian can determine whether a device with the same identifying information (e.g., a serial number or static address) has previously contacted the librarian. If the librarian determines that the device is known, process 500 can move to step 508. At step 508, the librarian can retrieve the owner of the device from stored records. Process 500 can then move to step 512, described below.

If, at step 506, the librarian instead determines that the device is not known to the librarian, process 500 can move to step 510. At step 510, the librarian can identify the owner of the device. For example, the librarian can retrieve ownership information from a communication of the device. In some embodiments, steps 506 and 508 can be skipped, and process 500 can automatically move from step 504 to step 510. At step 512, the librarian can retrieve a list of users trusted by the owner of the device. For example, the librarian can retrieve web of trust information associated with the owner, and identify other users trusted by the owner. At step 514, the librarian can identify personal clouds created for the owner, or personal clouds created for users trusted by the owner that require additional resources. For example, the librarian can identify a particular personal cloud associated with the owner, where the personal cloud prompted the owner to add addition resources to the personal cloud. In some embodiments, the librarian can instead not identify particular personal clouds requiring additional resources, but simply direct the device to be included in a personal cloud associated with the owner of the device. At step 516, the librarian can retrieve addressing information of devices in the identified personal cloud. In particular, the librarian can retrieve records from devices checking in with the librarian, where the devices checking in are associated with the trusted users or with the owner. Devices can check in regularly with the librarian so that the librarian can update mapping information that enables devices used in personal clouds to communicate with one another. At step 518, the librarian can provide the retrieved addressing information to the device. Using the addressing information, the device can communicate with the devices forming the personal cloud, and become integrated in the personal cloud. For example, the electronic device can implement one or more services used by the personal cloud. Process 500 can then end at step 520.

Once a newly available device has received addressing information for particular nodes of a personal cloud, the device can communicate with the nodes to join the personal cloud and provide an appropriate service (e.g., a catalog service, or a data service). The device can determine which service or services to provide using any suitable approach. In some embodiments, the device can identify the particular node providing the coordinating service, and request instructions from the coordinating service. In response to receiving an indication from the device, the coordinating service can review the services or operations provided by the existing nodes of the personal cloud, and determine which services need to be implemented by the new device (e.g., by comparing the identified existing services to a list of expected services). For example, the coordinating service can determine whether a service required for the proper operation of the personal cloud is missing, or is provided by too few nodes (e.g., whether a coordinating service needs to be provided by a node located geographically closer to an end user making use of the service). As another example, the coordinating service can determine whether data storage is required for storing new data on the cloud (e.g., whether a data service should implemented). As still another example, the coordinating service can determine whether a service should be shadowed to back up the cloud and to ensure seamless cloud operation. Based on the determination, the coordinating service can direct the new device to operate a particular service (e.g., to store particular data or perform another operation). The device can retrieve instructions (e.g., software, code, or input values) for operating the service from any suitable source including, for example, from an application loaded onto the device by a user, from the librarian, from the coordinating service, from other devices, from templates pre-installed in the device's software image, or a combination of these.

In some embodiments, the device newly added to the personal cloud can, instead or in addition, monitor the services provided by different nodes of the personal cloud, review the resources remaining on each of the nodes, and select a particular service or data storage activity based on the monitored use. In particular, the newly added device can determine whether potential problems exist so that the proper selection of a service can be made. For example, the device can determine that no device is shadowing an existing service operating on a particular node. As another example, the device can determine that existing nodes of the personal cloud have insufficient storage capabilities to store data provided by a user. As still another example, the device can determine that the distribution of services among the topology of the personal cloud nodes could be improved by implementing one or more particular services on the device. The device can then implement the selected service or activity.

Figure 6:
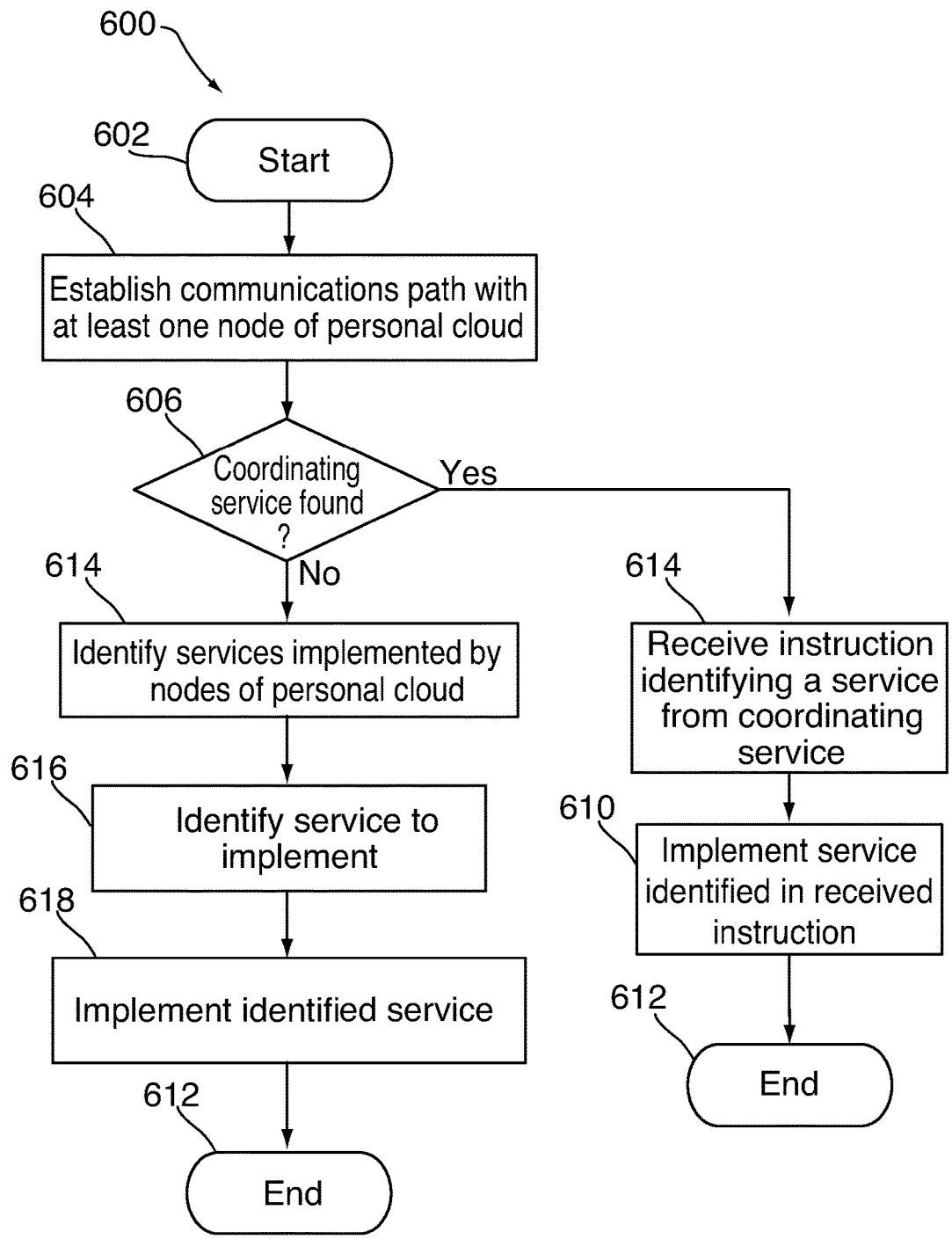
FIG. 6 is a flowchart of an illustrative process for configuring a device added to a personal cloud in accordance with one embodiment of the invention.

FIG. 6 is a flowchart of an illustrative process for configuring a device added to a personal cloud in accordance with one embodiment of the invention. Process 600 can begin at step 602. At step 604, a device can establish a communications path with at least one node of a personal cloud, where each node is formed by a device. For example, the device can receive at least one address from a librarian, and establish a communications path with a device at the received address. At step 606, the device can determine whether a coordinating service was found on one of the nodes with which a communications path was established. For example, the device can determine whether one of nodes operates an active coordinating service. As another example, the device can determine whether one of the nodes is shadowing an active coordinating service. If the device determines that a coordinating service is found, process 600 can move to step 608.

At step 608, the device can receive an instruction from the coordinating service defining a service or operation to perform form the personal cloud. For example, the coordinating service can identify a particular service that is under-provided by the personal cloud. At step 610, the device can implement the service or operation identified in the received instruction. For example, the device can implement a service retrieved from a locally stored application, from the coordinating service, or from the librarian. Process 600 can then end at step 612.

If, at step 606, the device instead determines that no coordinating service is found, process 600 can move to step 614. At step 614, the device can identify the services implemented on each node of the cloud. For example, the device can identify the services and operations implemented by the nodes with which communications paths have been established. In some cases, the device can, instead or in addition, retrieve, from the nodes with which the device communicates, address information for other nodes of the personal cloud. The device can then establish additional communications paths with those nodes to more completely map the services and operations provided by nodes of the cloud. At step 616, the device can identify a particular service or operation to implement in light of the services and operations implemented in the other nodes of the personal cloud. For example, the device can implement a coordinating service if none was implemented. As another example, the device can implement a different service (e.g., a data storage or catalog service) if no coordinating service is necessary, or if there is a coordinating service that is unavailable to provide a specific instruction to the device (e.g., as in step 608). At step 618, the device can implement the identified service or operation. Process 600 can then end at step 612.

In some cases, a particular device can be used in several personal clouds. For example, a device can be used by a personal cloud of the device owner, as well as in one or more personal clouds of users trusted by the device owner. A newly connected device can be used in any of the personal clouds. For example, a librarian can initially determine whether a personal cloud associated with the owner of a newly connected device requires the device. If so, the librarian can direct the device to be included the owner's personal cloud. Alternatively, if the librarian determines that a personal cloud of one of the owner's trusted users requires the resources of the device, the librarian can direct the device to establish a communications path with the trusted user's personal cloud.

In some embodiments, a device that serves as a node in several personal clouds can, instead or in addition, direct the newly connected device to connect to a particular one of the several personal clouds. For example, the newly connected device can establish a communications path with the device in the context of a first personal cloud (e.g., a personal cloud associated with the owner of the newly connected device). The device can receive the indication that the newly connected device is available, and determine whether the personal cloud associated with the owner of the newly connected device needs the newly connected device's resources. If the device determines that the owner's personal cloud does not require additional resources, the device can determine whether another personal cloud for which the device serves as a node requires additional resources. If another personal cloud requires the resources, the device can direct the newly connected device to integrate with the other personal cloud, provided it is associated with a user trusted by the owner of the newly connected device.

During use, the particular devices available to serve as nodes for a personal cloud can change. In particular, because nodes can be constructed from individual electronic devices used by users (e.g., as opposed to mass storage components), users may wish to limit or restrict the resources provided to a personal cloud by a particular network. For example, a user may disconnect a mobile device from the network while travelling. As another example, a user may limit access to processing resources during times when the user makes use of the device. As still another example, the user may reclaim storage resources to conduct a project (e.g., a media processing project), and later return some or all of the resources to the personal cloud. In some cases, however, the personal cloud can prevent a user from removing a device from the cloud because the cloud requires data or services provided by the device. This may lead to user frustration, as the user may feel that the user cannot control the use of the user's own device.

Figure 7A:
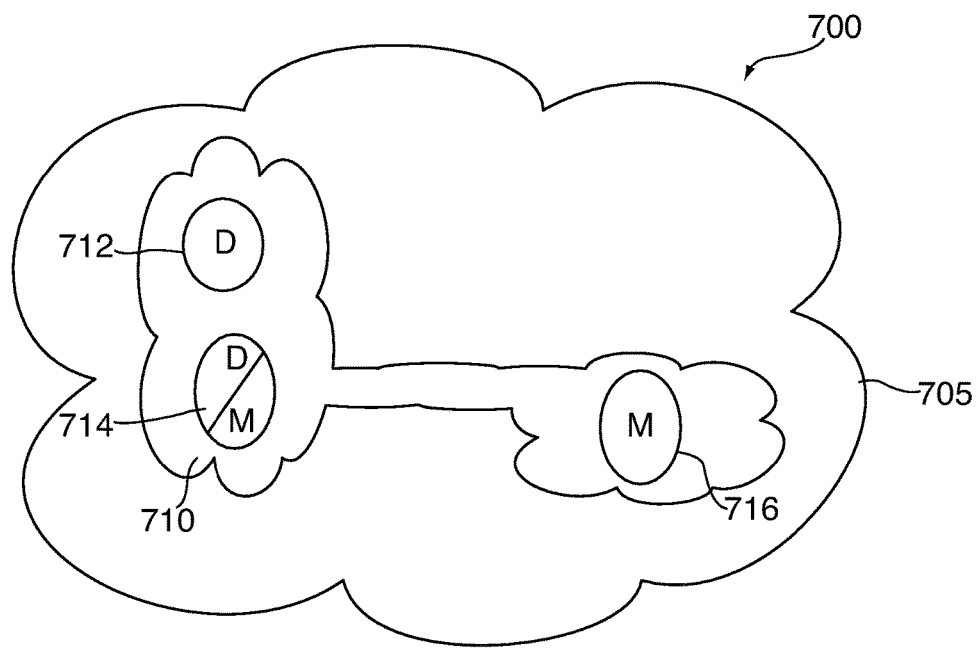
FIG. 7A is a schematic view of an illustrative personal cloud from which a node can be removed in accordance with one embodiment of the invention.

FIG. 7A is a schematic view of an illustrative personal cloud from which a node can be removed in accordance with one embodiment of the invention. System 700 can include personal cloud 710 within communications network 705. Personal cloud 710 can be constructed from any suitable number of nodes, each formed by distinct electronic devices. For example, personal cloud 710 can be constructed from nodes 712, 714 and 716. Each node can perform an operation or provide a service for the proper functioning of the personal cloud. For example, node 712 can be used to store data D (e.g., as part of a data service), node 714 can be used to store data D and operate service M (requiring corresponding metadata), and node 716 can be used to operate service M. The particular data and services provided by each of the nodes can be the same or different. For example, a service of a first node can shadow the operation of a service of a second node, or data stored on a first node can complement and back up data stored on a second node.

Figure 7B:
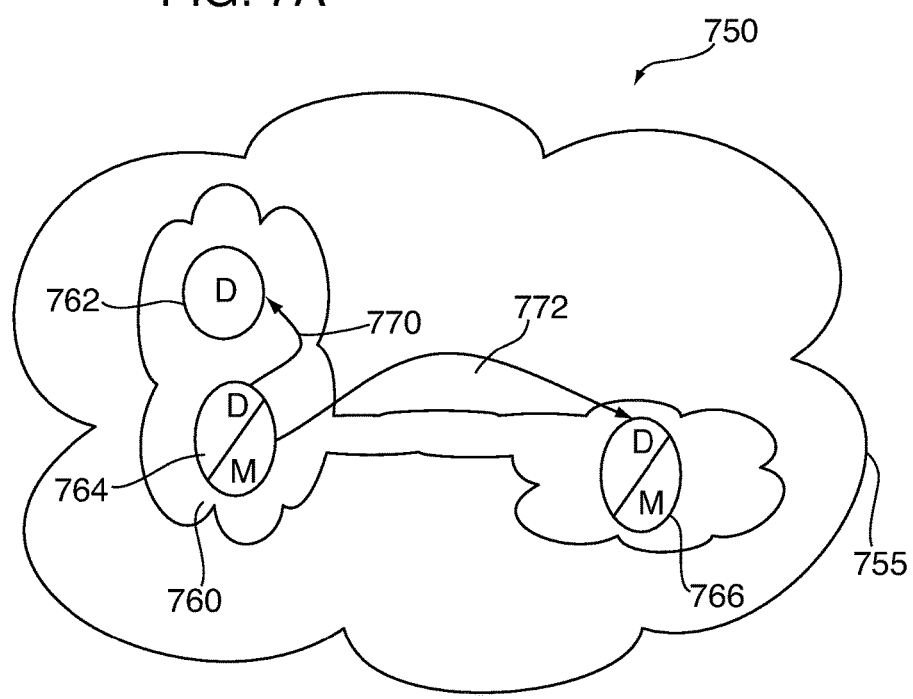
FIG. 7B is a schematic view of an illustrative personal cloud in which a node operation and service is migrated to allow the removal of the node in accordance with one embodiment of the invention.

In some cases, the owner of a device may wish to remove the device from the personal network. For example, the owner of the device that defines node 714 may wish to retrieve the resources of the device. FIG. 7B is a schematic view of an illustrative personal cloud in which a node operation and service is migrated to allow the removal of the node in accordance with one embodiment of the invention. System 750 can include personal cloud 760 within communications network 755, having some or all of the features of system 700 (FIG. 7A) described above. Personal cloud 760 can initially be constructed from nodes 762, 764 and 766. The nodes can perform any suitable operation or provide any suitable service for the personal cloud. When a user wishes to remove a device providing a node from the personal cloud, the operation and services of the personal cloud may need to be migrated to another device forming a different node. For example, if a user wishes to remove the device corresponding to node 764, the particular data D and service M may need to be provided by other nodes for the personal cloud to continue to operate properly.

Personal cloud 760 can use any suitable approach to transfer the operations of a particular node to other nodes. In one implementation, a user can provide an instruction to node 764 to remove itself from the personal cloud. In response to receiving the instruction, node 764 can identify other available nodes of the personal cloud, and transfer services to the other nodes. For example, node 764 can provide an instruction for another node to activate a particular service, and can provide up to date metadata necessary for the proper operation of the service. As another example, node 764 can transfer data stored as part of a data service, or metadata used by a service, to a different node. In the particular example of system 750, node 764 can transfer data (e.g., a data service) to node 762 (transfer 770) and metadata (e.g., for a catalog service) or a service as well as data (e.g., a data service) to node 766 (transfer 772), such that node 766 provides both a service and stores data after the transfer (instead of providing only a service, like node 716, FIG. 7A). Node 764 can prevent the user from disconnecting the device from the personal cloud until some or all of the data or service has been transferred, or ask the user for confirmation to remove the device if a transfer is not yet complete. This approach, however, may prevent a user from fully using the device of node 764 until data has been transferred in the personal cloud, which may take substantial time.

In some cases, the data and services provided by the personal cloud can be redundantly stored in other nodes. For example, data stored on node 764 may be backed up by data stored on node 762, and metadata corresponding to a service provided by node 764 can be shadowed or mirrored by node 766. In response to receiving an instruction to remove node 764 from the personal cloud, node 764 can provide instruction 770 to node 762 directing the node to become an active source for all of the data previously stored by node 764 (e.g., node 762 implements an active data service, or node 762 is notified that node 764 will no longer be backing up the data of node 762). Similarly, node 764 can provide instruction 772 directing node 766 to provide the service previously provided by node 764 (e.g., direct node 766 to activate a previously shadowing service, or notify node 766 that node 764 is no longer shadowing node 766). In some cases, instruction 772 can, instead or in addition, include data for node 766 to store. In some embodiments, node 764 can provide an indication to a coordinating service that its resources are being removed. In some cases, node 764 can indicate to the coordinating service which other nodes are taking over for the services provided by node 764. By redundantly storing services and data, a user can seamlessly remove a device from a personal cloud without affecting the operation of either the device or the personal cloud.

The personal cloud can determine how to transfer services or data used by a service using any suitable approach. In some embodiments, the individual node being removed can communicate with other nodes of the personal cloud to determine how to transfer a service. For example, the individual node can identify a device shadowing the service, or a device with sufficient resources to implement the service. In some embodiments, the individual node can, instead or in addition, indicate to a coordinating service that it is being removed. The coordinating service can then identify another node of the personal cloud for the service. In some cases, a remaining node (e.g., a node implementing a coordinating service) can detect that the individual node is no longer available by attempting and failing to establish a communications path with the individual node, and can reassign personal cloud services in response to the detected absence.

A personal cloud can dynamically migrate data and services between different nodes of a personal cloud for any suitable reason. For example, a personal cloud can migrate node operations based on a user request to remove a device providing a node, as described above. As another example, a personal cloud can migrate operations of a node when a node fails. The cloud can then operate in a manner similar to when a device is removed, where the particular data and services provided by the failed node can be migrated to other, healthy nodes.

In some embodiments, a personal cloud can migrate services to take advantage of additional resources available in one or more nodes. For example, a personal cloud can migrate services to nodes having additional resources to back up stored data or metadata corresponding to an active service. The nodes having additional resources can dynamically change the data or metadata stored to match the data or metadata of an active node, such that an active service can be shadowed in real time or in near-real time, thus ensuring a seamless transition of services between nodes should the active node fail or be removed. Similarly, devices added to grow or increase the capacity of the personal cloud can be used to store additional data, or to back up existing data or shadow a service.

In some embodiments, a personal cloud can dynamically migrate services to improve the performance of the personal cloud. For example, a personal cloud can selectively activate the same service provided by different nodes based on the geographic proximity of a node to an end user or connection speed between nodes and an end user. The nodes with inactive services can then mirror or shadow the active node until the geographic proximity of the user changes. In particular, the geographic disposition of users using a personal cloud can change over time (e.g., based on time zones, where users in Japan and users on the U.S. east coast do not use the personal cloud at the same time). As another example, a personal cloud can dynamically migrate services based on an expected or historical use of a service. In particular, if historically a particular power user makes use of the personal cloud at a particular day and time, services, data or both can be migrated to cater to the power user.

In some embodiments, a personal cloud can migrate services and data based on performance or energy considerations of individual nodes. For example, nodes having low power consumption can be activated and used more intensively than less power efficient nodes. The less power efficient nodes can be used for less power intense operations (e.g., data storage), or activated in response to detecting larger loads on the personal cloud. As another example, the personal cloud can monitor device performance over time. For example, the personal cloud can determine the processor type, storage type and read speed (e.g., HDD or SDD), connection type (e.g., wired or wireless, and network type), connection speed, or other properties of each device. The personal cloud can then select the particular devices having more performing components for active nodes in the personal cloud (e.g., nodes providing services with which a user can interact).

In some embodiments, a personal cloud can migrate services and data based on known or expected availability of individual devices. In particular, the personal cloud can monitor device availability over time, and establish a probability map of device availability on different days or at different times. For example, a personal cloud can detect that a device corresponding to an external storage device is almost always available, but has limited processing abilities, while a device corresponding to a desktop computer is available during weekday work hours, but not over the weekend. Similarly, a personal cloud can detect that a device corresponding to a notebook computer is generally available, but occasionally disconnects at times corresponding to meetings and to transit between locations. Based on the determined historic availability, the personal cloud can dynamically migrate services and data between the devices to ensure that the services and data are provided by available devices.

Figure 8:
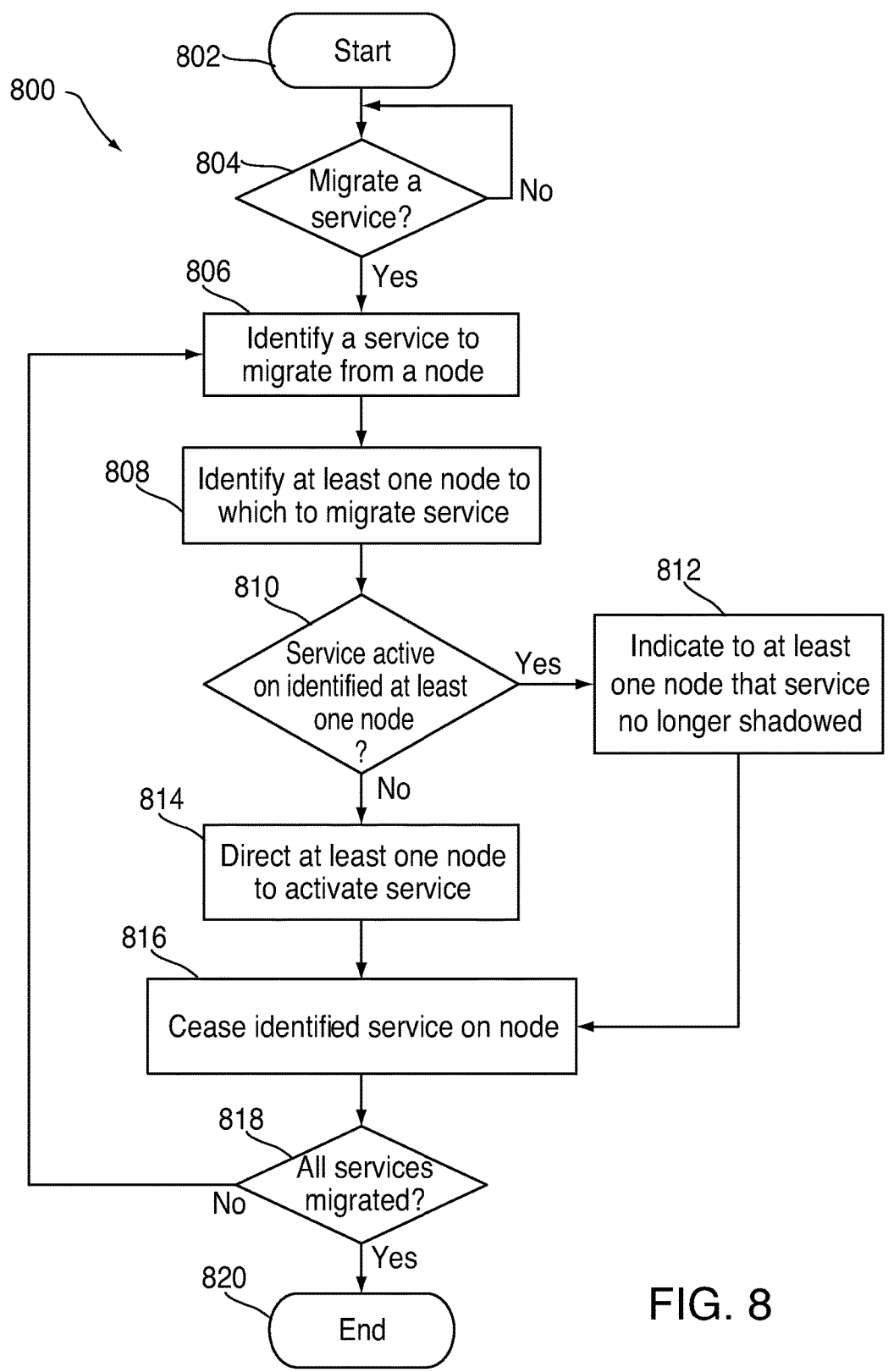
FIG. 8 is a flowchart of an illustrative process for seamlessly migrating services between nodes of a personal cloud in accordance with one embodiment of the invention.

FIG. 8 is a flowchart of an illustrative process for seamlessly migrating services between nodes of a personal cloud in accordance with one embodiment of the invention. Process 800 can begin at step 802. At step 804, the personal cloud can determine whether to migrate a service from a node. For example, the personal cloud can determine whether a reason or criteria for migrating a service has been met (e.g., failure, request to remove a device, performance, replication or backup, energy use, or growth). If the personal cloud determines that no service is to be migrated, process 800 can return to step 804. If, at step 804, the personal cloud instead determines that a service is to be migrated, process 800 can move to step 806. At step 806, the personal cloud can identify a particular service to migrate from the node. For example, the personal cloud can identify a catalog service, data service, healing or repair service, backup service, coordinating service, or other service provided to the personal cloud. In some embodiments, data used by a particular service (e.g., metadata or store data) can be migrated.

At step 808, the personal cloud can identify at least one other node to which the identified service can be migrated. For example, the personal cloud can identify a node having available resources (e.g., storage or processing) to receive the migrated service. As another example, the personal cloud can identify another node that has an active service or is shadowing the service. At step 810, the personal cloud can determine whether the service is active on the other node. For example, the personal cloud can determine whether the service is a shadow of an active service on the other node identified at step 808. If the personal cloud determines that the service is active on another node, process 800 can move to step 812. At step 812, the personal cloud (e.g., the node) can indicate to the other node that the service is no longer shadowed by the node from which the service is migrated. This can ensure that the other node identifies or requests that a different node shadow the service. Process 800 can then move to step 816.

If, at step 810, the personal cloud instead determines that the service is not active on the other node, process 800 can move to step 814. At step 814, the personal cloud can direct the other node to activate the service. For example, the node can instruct the other node identified at step 808 to implement the service. At step 816, the node can cease operation of the identified service. For example, the node can stop receiving and sending data that corresponds to the service to other nodes of the personal cloud. As another example, the node can release or remove stored data that corresponds to the identified service. At step 818, the personal cloud can determine whether all services of the node have been migrated. For example, the personal cloud can determine whether several services need to be migrated. If the personal cloud determines additional services need to be migrated, process 800 can return to step 806 and identify another service. If, at step 818, the personal cloud instead determines that no additional services need to be migrated, process 800 can move to step 820 and end.

Although many of the embodiments of the present invention are described herein with respect to personal computing devices, it should be understood that the present invention is not limited to personal computing applications, but is generally applicable to other applications.

The invention is preferably implemented by software, but can also be implemented in hardware or a combination of hardware and software. The invention can also be embodied as computer readable code on a computer readable medium. The computer readable medium can be any data storage device that can store data that can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code can be stored and executed in a distributed fashion.

Insubstantial changes from the claimed subject matter as viewed by a person with ordinary skill in the art, now known or later devised, are expressly contemplated as being equivalently within the scope of the claims.

The above described embodiments of the invention are presented for purposes of illustration and not of limitation.

What is claimed is:

1. A method implemented by a computing device that implements a cloud management service, the method comprising:
    establishing a connection with a client device;
    receiving an instruction from the client device to establish a personal cloud network between the client device and at least one additional client device to form a plurality of client devices, wherein each client device of the plurality of client devices shares at least a portion of respective available resources that can be provided by the client device to the personal cloud network for implementing a set of services;
    dynamically assigning tasks associated with the set of services to the plurality of client devices;
    detecting a condition in which the plurality of client devices is incapable of carrying out at least one task associated with the set of services, wherein the at least one task is generated by a particular client device of the plurality of client devices;
    causing the particular client device to display a prompt that indicates additional available resources are needed to enable the at least one task to be carried out; and
    in response to detecting an addition of an auxiliary client device that (i) is a member of the personal cloud network, and (ii) previously authorized the personal cloud network to utilize resources of the auxiliary client device that enable the at least one task to be carried out:
        causing the particular client device to cease displaying the prompt, and
        causing the at least one task to the auxiliary client device to carry out the at least one task.

2. The method of claim 1, wherein the set of services includes at least one of:
    cataloging services;
    processing services;
    parallel processing services;
    data storage services;
    redundant storage services; or
    backup services.

3. The method of claim 1, wherein the addition of the auxiliary client device is detected in response to the auxiliary client device rejoining a network shared by the plurality of client devices.

4. The method of claim 1, wherein the prompt includes a recommendation to add at least one client device to the personal cloud network.

5. The method of claim 4, wherein the recommendation includes the particular client device.

6. A cloud management system, comprising:
    at least one processor; and
    at least one memory storing instructions that, when executed by the at least one processor, cause the cloud management system to:
        establish a connection with a client device;
        receive an instruction from the client device to establish a personal cloud network between the client device and at least one additional client device to form a plurality of client devices, wherein each client device of the plurality of client devices shares at least a portion of respective available resources that can be provided by the client device to the personal cloud network for implementing a set of services;
        dynamically assign tasks associated with the set of services to the plurality of client devices;
        detect a condition in which the plurality of client devices is incapable of carrying out at least one task associated with the set of services, wherein the at least one task is generated by a particular client device of the plurality of client devices;
        cause the particular client device to display a prompt that indicates additional available resources are needed to enable the at least one task to be carried out; and
        in response to detecting an addition of an auxiliary client device that (i) is a member of the personal cloud network, and (ii) previously authorized the personal cloud network to utilize resources of the auxiliary client device that enable the at least one task to be carried out:
            cause the particular client device to cease displaying the prompt, and
            cause the at least one task to the auxiliary client device to carry out the at least one task.

7. The cloud management system of claim 6, wherein the set of services includes at least one of:
    cataloging services;
    processing services;
    parallel processing services;
    data storage services;
    redundant storage services; or
    backup services.

8. The cloud management system of claim 6, wherein the addition of the auxiliary client device is detected in response to the auxiliary client device rejoining a network shared by the plurality of client devices.

9. The cloud management system of claim 6, wherein the prompt includes a recommendation to add at least one client device to the personal cloud network.

10. The cloud management system of claim 9, wherein the recommendation includes the particular client device.

11. A non-transitory computer-readable medium storing instructions that, when executed by at least one processor of a cloud management system, cause the cloud management system to:
establish a connection with a client device;
receive an instruction from the client device to establish a personal cloud network between the client device and at least one additional client device to form a plurality of client devices, wherein each client device of the plurality of client devices shares at least a portion of respective available resources that can be provided by the client device to the personal cloud network for implementing a set of services;
dynamically assign tasks associated with the set of services to the plurality of client devices;
detecting a condition in which the plurality of client devices is incapable of carrying out at least one task associated with the set of services, wherein the at least one task is generated by a particular client device of the plurality of client devices;
causing the particular client device to display a prompt that indicates additional available resources are needed to enable the at least one task to be carried out; and
in response to detecting an addition of an auxiliary client device that (i) is a member of the personal cloud network, and (ii) previously authorized the personal cloud network to utilize resources of the auxiliary client device that enable the at least one task to be carried out:
causing the particular client device to cease displaying the prompt, and
causing the at least one task to the auxiliary client device to carry out the at least one task.

12. The non-transitory computer-readable medium of claim 11, wherein the set of services includes at least one of:
cataloging services;
processing services;
parallel processing services;
data storage services;
redundant storage services; or
backup services.

13. The non-transitory computer-readable medium of claim 11, wherein the addition of the auxiliary client device is detected in response to the auxiliary client device rejoining a network shared by the plurality of client devices.

14. The non-transitory computer-readable medium of claim 11, wherein the prompt includes a recommendation to add at least one client device to the personal cloud network.

15. The non-transitory computer-readable medium of claim 14, wherein the recommendation includes the particular client device.

16. The method of claim 1, wherein the prompt includes a description of the condition.

17. The method of claim 16, wherein the prompt identifies at least one client device of the plurality of client devices capable of carrying out the at least one task.

18. The cloud management system of claim 6, wherein the prompt includes a description of the condition.

19. The cloud management system of claim 18, wherein the prompt identifies at least one client device of the plurality of client devices capable of carrying out the at least one task.

20. The non-transitory computer-readable medium of claim 11, wherein the prompt includes a description of the condition.

* * * * *